United States Patent [19]

Kaaden

[11] Patent Number: 4,753,592
[45] Date of Patent: Jun. 28, 1988

[54] APPARATUS FOR PRODUCING PLASTIC PARTS BY INJECTION MOLDING OR REACTION INJECTION MOLDING

[76] Inventor: Hans-Heinrich Kaaden, Up de Ring 12, 2944 Wittmund 2, Fed. Rep. of Germany

[21] Appl. No.: 865,197
[22] PCT Filed: Jul. 26, 1985
[86] PCT No.: PCT/DE85/00252
  § 371 Date: Apr. 1, 1986
  § 102(e) Date: Apr. 1, 1986
[87] PCT Pub. No.: WO86/01146
  PCT Pub. Date: Feb. 27, 1986

[30] Foreign Application Priority Data

Aug. 4, 1984 [DE] Fed. Rep. of Germany ....... 3428780

[51] Int. Cl.$^4$ ............................................ B29C 45/74
[52] U.S. Cl. .................. 425/547; 264/328.8; 264/328.14; 425/549; 425/572; 425/588
[58] Field of Search ............... 425/588, 549, 567–572, 425/574, 575, 589, 548, 577, 547, DIG. 35, 450.1, 451.9; 264/328.8, 328.14, 328.15, 328.16

[56] References Cited

U.S. PATENT DOCUMENTS

| | | | |
|---|---|---|---|
| 2,331,015 | 10/1943 | Dawes et al. ............... | 425/DIG. 35 |
| 2,333,059 | 10/1943 | Tucker ......................... | 264/328.8 X |
| 2,556,818 | 6/1951 | Menzel ......................... | 425/577 |
| 2,871,517 | 2/1959 | Allard .......................... | 264/328.8 X |
| 3,417,433 | 12/1968 | Teraoka ....................... | 264/328.8 X |
| 4,005,964 | 2/1977 | Bishop ......................... | 425/588 |
| 4,025,268 | 5/1977 | Taylor .......................... | 425/588 X |
| 4,090,837 | 5/1978 | Balevski et al. .............. | 425/588 |
| 4,497,624 | 2/1985 | Brun et al. ................... | 425/548 |

FOREIGN PATENT DOCUMENTS

| | | |
|---|---|---|
| 1124235 | 2/1962 | Fed. Rep. of Germany . |
| 1479461 | 9/1969 | Fed. Rep. of Germany . |
| 2437248 | 2/1976 | Fed. Rep. of Germany . |
| 2723848 | 12/1978 | Fed. Rep. of Germany . |
| 1380689 | 10/1964 | France . |
| 2234121 | 1/1975 | France . |
| 31547 | 2/1982 | Japan .................. 264/328.8 |
| 178733 | 11/1982 | Japan . |
| 181624 | 10/1983 | Japan . |
| 166030 | 10/1983 | Japan .................. 425/588 |
| 183231 | 10/1983 | Japan .................. 425/588 |
| 209540 | 12/1983 | Japan .................. 425/588 |
| 428194 | 7/1967 | Switzerland . |
| 1337384 | 11/1973 | United Kingdom . |
| 1423498 | 2/1976 | United Kingdom . |
| 2076730 | 12/1981 | United Kingdom . |

Primary Examiner—Richard L. Chiesa
Attorney, Agent, or Firm—Collard, Roe & Galgano

[57] ABSTRACT

An injection molding apparatus for the manufacture of plastic parts from thermoplastic, duroplastic and/or elastomer material by injection molding or reaction injection molding is provided. The apparatus has a multi-station locking unit of horizontal or vertical design adapted to receive a plurality of molds, an injection unit associated therewith for the simultaneous injection of the molds, two outer mold-clamping plates one of which is movably arranged on guide elements for moving in the locking direction, and a centrally disposed mold-receiving part movably arranged on guide elements between the two mold-clamping plates. The mold-receiving part is provided with a heatable melt-guiding system with sprue nozzles and has fastened to each of its two sides one half of a mold. The centrally disposed mold-receiving part is a mold-clamping plate divided crosswise relative to the locking direction, wherein the two parts are kept together by a high-speed clamping device. The melt-guiding system is arranged between the two parts of the mold-clamping plate. Separate driving cylinders are fastened on the centrally disposed mold-clamping plate.

6 Claims, 9 Drawing Sheets

APPARATUS FOR PRODUCING PLASTIC PARTS BY INJECTION MOLDING OR REACTION INJECTION MOLDING

BACKGROUND OF THE INVENTION

1. Field of the Invention

The present invention relates to an apparatus for producing plastic parts formed of thermoplastics, duroplastics and/or elastomers by the injection molding or reaction injection molding technique. The apparatus has one or a plurality of locking units of the horizontal or vertical design for receiving one or a plurality of molds arranged on one plane, and an associated injection unit for successively injecting the molds, in which each half of a mold is arranged on a mold-clamping plate with one of said plates being movably arranged in each case.

2. Description of the Prior Art

Devices are known in which several locking units are associated with the injection unit which is displaceable on one plane, or in which the injection unit is arranged stationary and the locking units are displaceable on one plane.

The molding of the molded parts requires cooling periods as a result of the nature of the molding process. Therefore, also multi-station devices are used in the manufacture of large series. Such multi-station devices are suitable for producing plastic parts with small or medium dimensions, but less suitable for the manufacture of larger parts. The use of mobile production plants for the manufacture of large molded parts is uneconomical. For producing one single large molded parts in large numbers, several individual devices are required, which require extensive equipment, much setup space and much energy.

With the devices of the known type, the full mold-clamping or mold-closing forces are required for injecting each individual mold of the molds disposed on one plane, i.e., the full forces rated for the technique. This means that high energy-intensive mold-clamping forces may be required depending on whether the high-pressure or low-pressure technique is employed.

SUMMARY OF THE INVENTION

The object of the present invention is to economically mass-produce high-quality plastic parts from thermoplastics, duroplastics (thermosetting plastics) and elastomers, in particular flat molded parts with large surfaces and thin walls of high quality by injection or reaction injection molding with a minimum of equipment, setup space and energy requirements.

A solution to this problem is a prerequisite for the use of new high-quality plastics for new fields of application. This includes, among other things, the use of high-quality chemical materials with a custom-made profile of properties for exterior and interior parts in automobile body construction. The advantages connected therewith with respect to weight savings, freedom from corrosion and improved function as well as unlimited design possibilities particularly for injection-molded auto body parts are highly significant for future auto body construction. In the future, the subassemblies of parts or components, which, until now, have been welded together from a number of individual sheet metal parts, will be combined from a much lesser number of individual parts to form an assembly or unit of plastic parts. High-quality plastic auto body parts open up entirely new possibilities. The improvements in function connected with the use of high-quality chemical materials, furthermore, will significantly help to satisfy the stricter requirements with respect to vehicle safety and economy.

Plastic auto body parts are supporting and grid-type parts with large surface area and volume, as well as exterior and interior linings which, in most cases, have a flat shape. Said parts have to be economically produced in great numbers with a narrow width of manufacturing tolerances and excellent quality.

According to the invention, said problem is solved with the help of a multi-station locking unit comprised of one or a plurality of 2-stage locking units of the horizontal and/or vertical type of design, whereby each 2-stage locking unit has two mold stages, with two movable mold-clamping plates and one fixed mold-clamping plate being associated with each mold stage, said movable mold-clamping plates being movable horizontally or vertically on a plurality of guide elements, as well as with one or a plurality of injection units for the high-pressure injection molding or reaction injection molding technique, said injection units being displaceably or stationarily disposed on the outside.

Usefully, the multi-station locking unit has a fully hydraulic locking system, whereby one or a plurality of locking cylinders are associated with each 2-stage locking unit. The locking cylinders are connected with a fixed end plate and, by way of one or a plurality of locking pistons, with the outer movable mold-clamping plate, forming a single fixed unit. According to another feature of the invention, the center mold-clamping plate is arranged to be movable by means of separate driving cylinders. In a preferred embodiment, each mold stage is formed by two molds comprised of identical parts, each mold being comprised of two mold halves.

With a single application of the process according to the invention for producing plastic parts with the use of the inventive apparatus, the two molds of a locking unit, which are comprised of identical parts and arranged between the three mold-clamping plates, are simultaneously injected by an injection unit with application of the high-pressure or low-pressure injection molding technique, whereby the pairs of molds of each 2-stage locking unit are alternatively injected based on the cascade principle.

The cooling periods required in the course of production because of these processes are largely compensated for by the alternating injection of the molds by application of the cascade principle. Also, another advantage is gained in connection with the removal of the finished plastic parts from the individual mold stages in that only one way of mold opening is required for two mold stages. This permits removing the finished plastic parts from four mold stages a single after the other with the help of one automatic device for removing said parts. By arranging two molds in tandem, which molds comprise of identical parts, with the horizontal type of design or construction, or two molds of identical parts one on top of the other with the vertical type of design in each locking unit, the output rate (finished parts) is doubled while the clamping force requirement remains unchanged. The cooling time required for molding the plastic parts in the molds of the first locking unit, which, in the high-pressure injection molding process, is required on completion of the dwell time, is exploited on the driving side for keeping the molds closed in the second locking unit for the next-following mold-filling operation.

According to the invention, it is possible to manufacture complicated auto body parts with large surface areas from plastics by injection molding or reaction injection molding. The locking units have an adequate height for the installation of the molds and adequate means for opening the molds with a minimum of floor space. The column design results in an arrangement with open sides within the zone of the molds, which permits devices for removing the parts to be mounted in any desired position.

The individual groups of parts or subassemblies of the device such as the locking unit, the injection unit, the driving gear and the control systems are assembled from standardized component groups using the modular system which groups may be combined among each other. The fully hydraulic locking system assures rigid clamping with parallel alignment of the plates for producing large plastic auto body parts. The closing and opening rates of the locking and driving units can be controlled in stages. The same applies to the low-pressure phase (die protection) with simultaneous monitoring of the pressure. By arranging a plurality of injection units, which are equipped with a plurality of melting (plasticizing) cylinders and screws, two molds may be injected simultaneously. Parts with large surface areas and with an extreme length-to-wall-thickness-ratio can be manufactured in high quality and large numbers in an economical way at high injection rates.

The high-pressure injection molding technique is especially suitable for producing complicated molded high-precision parts. Novel modified thermoplastic and duroplastic (thermosetting) molding compounds open new and progressive application possibilities especially for large molded parts. However, as compared to the conventional materials, said new compounds have to permit processing within close tolerance limits and high quality and allow an economical manufacture of large series. In addition to the material and processing (molding) requirements and optimal mold engineering, production devices are needed that assure high constancy of the processing parameters in the production of large series. In the high-pressure injection molding process, the mold filling operation is especially important. In this connection, basic requirements with respect to the shape of the mold parts are based on the flow path/wall thickness relation.

Important preconditions include excellent flow properties of the melt, high injection rates and pressures, the correct sprue system and the correct gate position in order to obtain molded precision parts of high quality and dimensional constancy.

BRIEF DESCRIPTION OF THE DRAWINGS

Embodiments of the invention are described in the following and shown in the drawing, in which.

DESCRIPTION OF THE PREFERRED EMBODIMENT

A multi-station locking unit 1 is arranged in a frame-like stand structure 9. Each locking unit A;B is associated with four guide elements 6, whereby the center guide elements 6 are associated with half of their sides with the two locking units A; B. The guide elements 6 are supported on the front or face sides with half of their sides in the frame-like stand structure 9. With the horizontal type of design, the guide elements 6 are provided in the form of struts, and with the vertical type of design in the form of columns. Also, each locking unit A; B may be separately associated with four guide elements 6, in which case the individual 2-stage locking units A and B are assembled to form one multi-station locking unit.

A 2-stage locking unit A; B has two movable mold-clamping plates 3 and 4 or 4', and one fixed mold-clamping plate 2. Said fixed mold-clamping plate 2, with the horizontal type of design, is arranged on an outer side of the locking unit, and disposed at the bottom side of the locking unit with the vertical type of construction. The two horizontally or vertically moving mold-clamping plates 3 and 4 or 4' of the 2-stage multi-station locking units A and B are supported and guided in each case in the semi-cup bearings 8, in each case on four guide elements 6. The center mold-clamping plate 4; 4' is arranged movable by means of the separate driving cylinders 13 and has the dismountable bearing supports 7. In addition, the movable mold-clamping plates 3; 4; 4' are slidably arranged on the guiding tracks 10, which are secured or fastened in the frame-like stand structure 9. The bearings 11 serve for said purpose.

The multi-station locking unit 1 has a fully hydraulic locking system, whereby one or a plurality of locking cylinders 12 are associated with each 2-stage locking unit A; B, said locking cylinders being connected with a fixed end plate 5 and, by way of one or a plurality of locking pistons 12' with the outer movable mold-clamping plate 3, formed a fixed unit. The fixed end plate 5 is followed by an oil tank 14 with a pumping station and valve station.

The fixed mold-clamping plate 2 and the fixed end plate 5 are positively connected (force-locked) with the guide elements 6. A mold 18; 19 is arranged between the fixed mold-clamping plate 2 and the center movable mold-clamping plate 4; 4' as well as between the latter mold-clamping plate and the outer movable mold-clamping plate 3. A mold half 18", 19' is arranged fixed on each of the two sides of the center, movable mold-clamping plate 4; 4'. The sprue sides of the mold halves 18"; 19' are fastened on the mold-clamping plate 4; 4'. The other mold halves 18' and 19" are fastened on the fixed mold-clamping plate 2 and on the outer movable mold-clamping plate 3.

Figure 7:
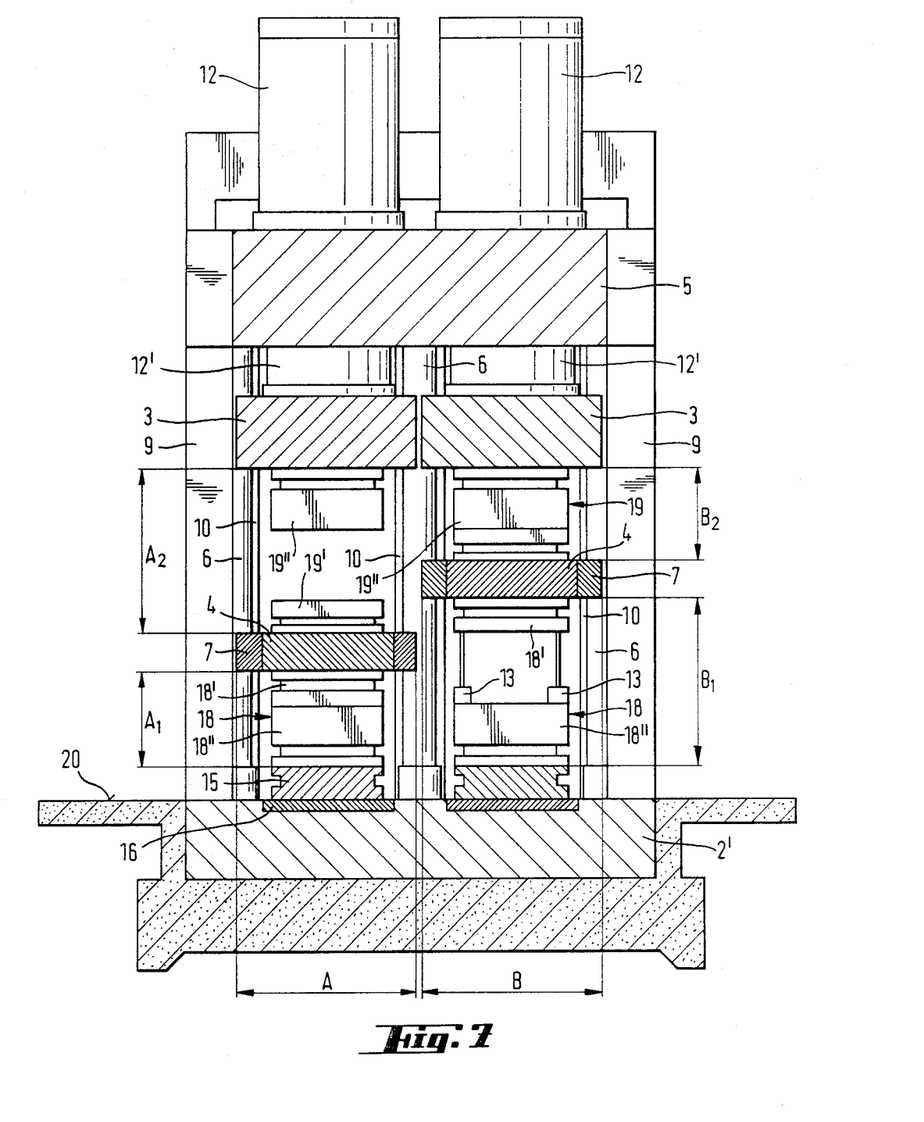
FIG. 7 is a vertical sectional view of a multi-station locking unit with one mold closed and one mold open in each vertical mold stage.
Figure 8:
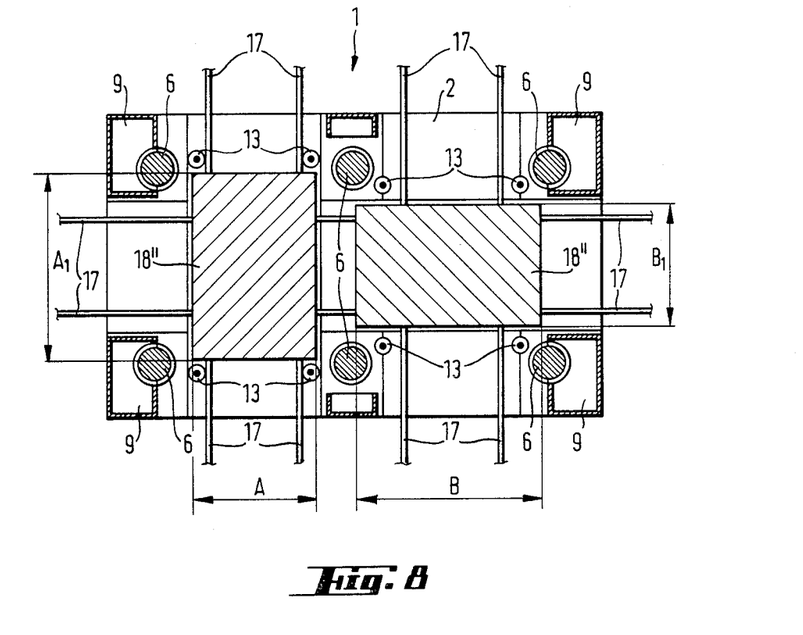
FIG. 8 is a horizontal sectional view showing a cut through two mold halves arranged fixed on the sliding table with the vertical type of design, showing a variation of the mold arrangement.
Figure 9:
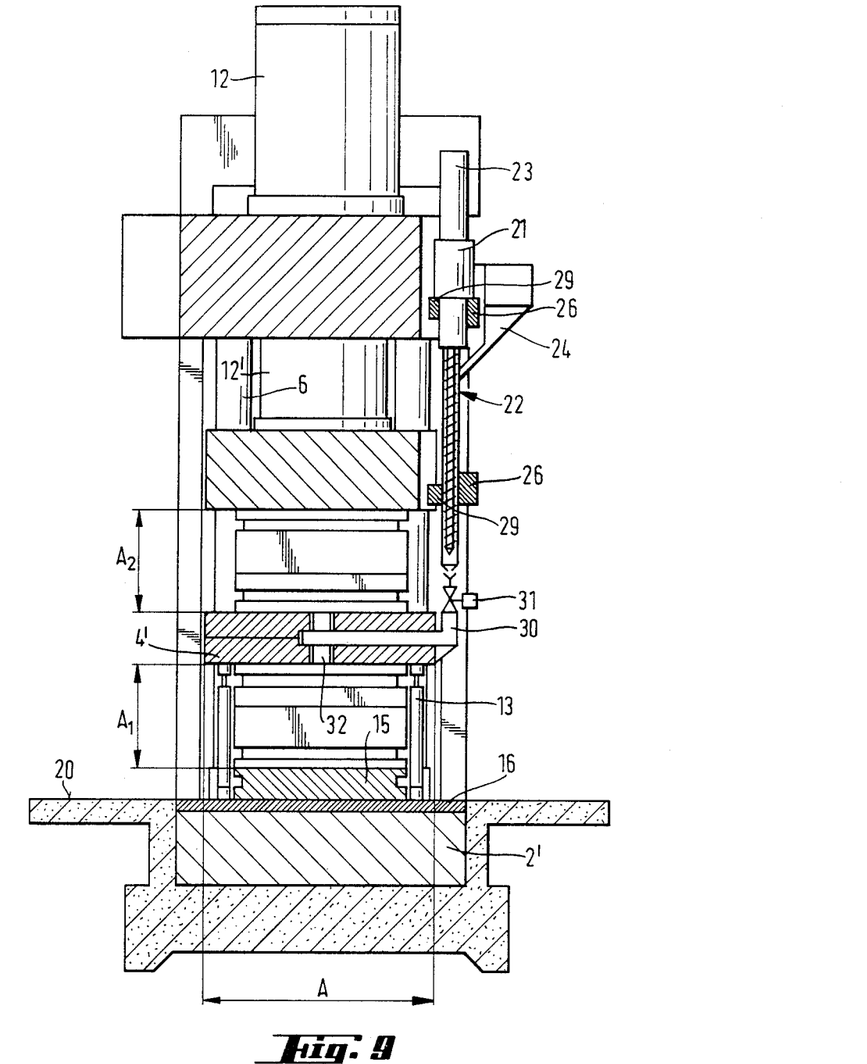
FIG. 9 shows a vertical sectional view of a multi-station locking unit with two closed molds in the vertical type of construction, combined with an injection unit for the high-pressure injection molding technique.

With the vertical type of design shown in FIG. 7, a sliding table 15 capable of being retracted and extended in the longitudinal and transverse directions is associated with each 2-stage locking unit A; B, which table, in the production position, is supported on a sliding table plate 16, which is disposed flush with the top edge of the floor 20. The foundation plate 2' is disposed beneath said plate 16. A mold half 18' is fastened on the sliding table 15, so that the arrangement of the fixed mold-clamping plate 2 may be omitted with this design.

The multi-station locking unit 1 of the 2-stage type of design is completely equipped with devices for processing thermoplastic or duroplastic molding compounds by high-pressure injection molding, including the screw units 22 and the drive 23, or with storage tanks, batching or dosing devices and mixing heads for processing by reaction and low-pressure molding. For economical reasons, the multi-station locking unit 1 is designed or engineered only for the mold-clamping forces required for the one or other technique.

For the processing of molding compounds with the screw units 22 by high-pressure injection molding, one injection unit 21 is movably arranged for each 2-stage locking unit on the outer sides parallel to the mold-clamping plates 2; 3; 4; 4'. Each injection unit 21 consists of one or a plurality of plasticizing (melting) cylinders and screws 22 and the screw drive 23. The screw units 22 are adjustable both length- and crosswise among each other and within the injection unit 21.

The individual screw units 22 of the injection unit 21 are commonly supported on a number of driving bridges 26 provided with the fastening parts 29. In this connection, the driving bridges 26 with the required abutments 27 are guided horizontally and/or vertically on the guiding tracks 25, which are arranged fixed in the frame-like stand 9.

Each injection unit 21 is associated with a plurality of separate driving cylinders 28, which are arranged within the bridge construction.

For processing multi-component molding compounds by the reaction and low-pressure techniques, one or a plurality of injection units are arranged for each 2-stage locking unit A; B next to the multi-station locking unit 1 on the same level with the latter.

The injection unit for multi-component molding compounds is equipped with tanks and work vessels or containers, batching (dosing) pumps and multi-component mixing heads. The multi-station locking unit, in the high-pressure injection molding process, permits injecting the molds 18 and 19 by way of a sprue system disposed on the mold separation level or plane 18'''; 19''', or by way of a central hot-duct system covering the total area. With both sprue systems, each injection unit 1 for the 2-stage operation is equipped with two screw units 22 Each screw unit 22 is associated with a mold stage $A_1$; $A_2$; or $B_1$, $B_2$, respectively. In each case, the molds 18 and 19 in the 2-stage locking unit are injected simultaneously.

The injection of the molds 18 and 19 on the separation level 18'''; 19''' is limited due to the flow path/wall thickness ratio especially when producing large and thinwalled molded parts. With molded parts for which the feed is possible by way of the mold separation level, the molds are injected by way of a 90° molded part. For injecting the molds, the injection unit 21 with the two screw units 22 drives onto the sprue bushings of the 90° molded piece of the molds 18 and 19. For this operation, two screw units 22 are additionally arranged within the screw unit 21, said additional units being arranged in a way such that they can be driven over short distances. Said design permits an exact positive abutting of a plurality of injection cylinder nozzles on a plurality of mold bushings. After the molds 18 and 19 have been injected, the injection unit 21 drives off the molds 18 and 19 by means of the driving cylinders 28. Thereafter, the molds 18 and 19 may be opened and the molded parts can be removed.

Injection of the molds 18 and 19 by way of the mold separation level 18'''; 19''' is selectively possible also with an injection unit 21 which is arranged in L-position with respect to the 2-stage locking unit A; B on the same level. With said arrangement, the molds 18; 19 are injected by way of the injection cylinder nozzles directly on the mold separation level 18'''; 19'''. In this case, the 90° molded part is omitted. Also in this arrangement, the injection unit 21 is equipped with two screw units 22 for simultaneously injecting the molds 18 and 19 in the mold stage $A_1$; $A_2$; and $B_1$; $B_2$.

For injecting the molds 18 and 19, the injection unit 21 drives onto the mold bushings on the separation level (plane) and locks said bushings with the molds 18 and 19 and the center, movable mold-clamping plate 4. Before the molded parts are removed, the injection unit 21 drives off said molds 18 and 19. However, the L-position of the injection unit 21 is connected with a higher setup space requirement for the total device.

Injection of the molds 18 and 19 in the hot-duct system is used especially for processing thermoplastics. The function of the hot duct is to transfer or pass the melt without loss of heat or overheating from the nozzle of the injection cylinder via heated hot duct blocks 30 and hot duct nozzles and into the nest of the mold. When producing molded parts with large surface areas and thin walls, this is often possible only by means of a hot duct system with multiple nozzles in order to manufacture such molded parts in a perfect way in terms of molding technology. The hot duct system is noted for a particularly high degree of economy. Savings of sprue material, no reworking of the molded parts and short cycle periods are important advantages of said technique.

When the hot duct system is used, the center, movable mold-clamping plate consists of a divided plate 4' and thus of two individual plates. A heated central hot duct block 30 for the two molds 18 and 19 is disposed between the two plates 4'. The heated central hot duct block 30 has for each mold 18 and 19 a separate and a central hot runner. Simultaneous injection with two screw units, which are arranged next to each other, takes place via an also heated Y-shaped 90° molded piece which is rigidly connected with the central hot duct block 30. At the melt inlet, the Y-shaped 90° molded piece is provided with two heated, hydraulically operated closing nozzles 31. At the melt outlet, where the melt exits from the central hot duct block 30, two machine nozzles 32 are disposed. Said nozzles extend through the center bores of the mold-clamping plates 4' directly to the central mold bushings of the hot duct systems for the molds 18 and 19. The two central nozzles 32 are heated and supported for a short stroke and hydraulically forced against the mold bushings in molds 18 and 19 for positively resting on said bushings. At the melt outlet, the injection cylinders of the injection unit 21 are also equipped with hydraulic closing nozzles.

For injecting the molds 18 and 19, the injection unit 21 drives with the injection cylinder closing nozzles onto the central machine closing nozzles 31 of the hot duct block 30 with the help of the driving cylinders 28. As the injection operation starts, the two hydraulic closing nozzles—which are disposed next to each other—open and release the flow of melt. A system with a total of four heated closing nozzles is required for two molds of a 2-stage locking unit.

For injecting the molds and for removing the molded parts, the injection unit 21 drives into the injection or removing position parallel to the molds 18 and 19 with the help of the driving cylinders 28. In order to avoid freezing of the melt and cold plugs at the nozzle orifices and inlets, the melt is kept always flowing in all systems.

In the production with 2×2 mold parts with identical components in a multi-station locking unit 1, it is possible to inject a total of four molds with only one injection unit 21 and two screw units 22. For said purpose, the injection unit 21 is arranged in such a way that it can be driven not only parallel to the mold-clamping plates 2; 3; 4; 4', but also crosswise by means of the two 2-stage locking units A; B. In this case, the molds are injected also based on the cascade principle and predetermined program.

Selectively, it is possible, furthermore, to rigidly connect the injection unit 21 with the center movable mold-clamping plate 4'. In said embodiment, the screw units 22 are also rigidly connected with the hot duct block 30 by way of two heated hot duct adapters. During the mold opening or mold closing operation or motion, the total injection unit 1 of the 2-stage locking unit A and B is forced to travel by a mold-opening distance, whereby the motion performed by means of the closing or locking cylinders 12 and driving cylinders 13 is synchronously supported by the driving cylinders 28 of the injection unit 21.

Figure 1:
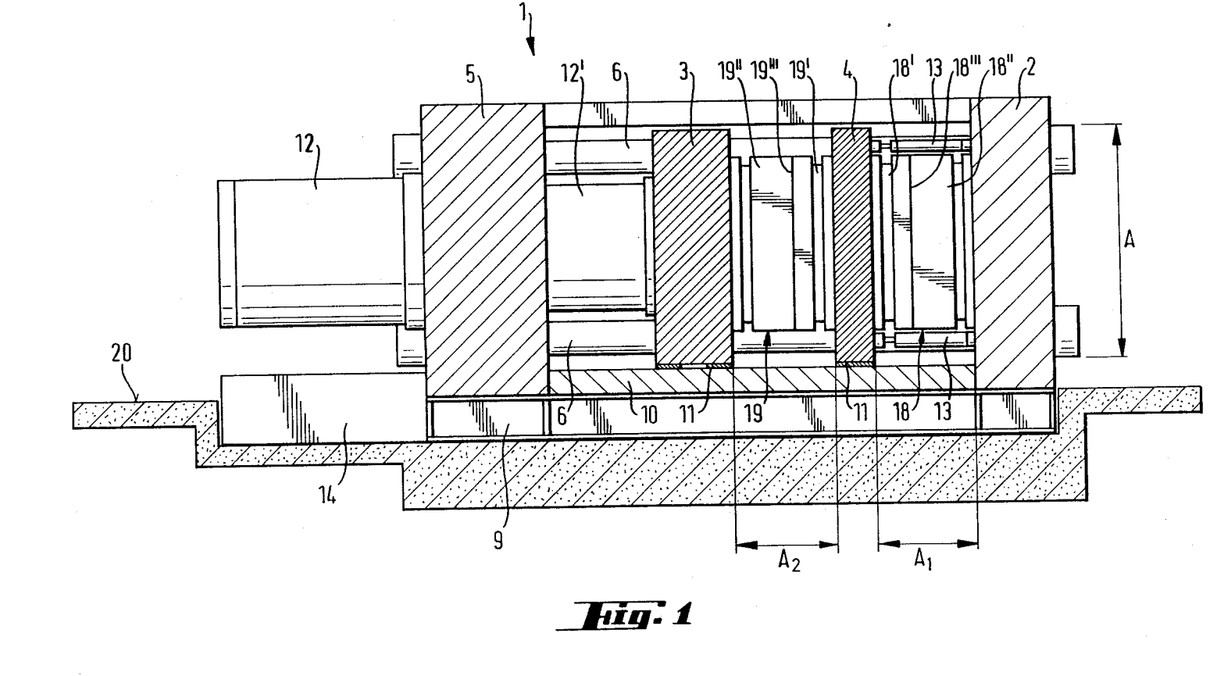
FIG. 1 is a vertical sectional view of a multi-station locking unit with two closed molds with the horizontal type of stage construction.
Figure 2:
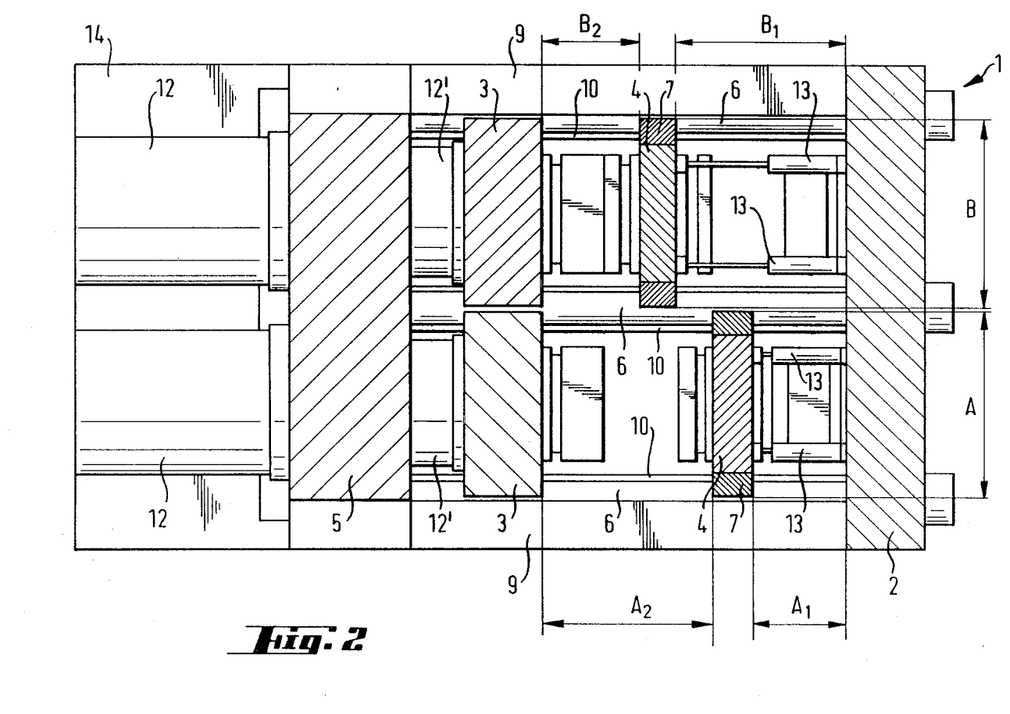
FIG. 2 is a horizontal sectional view of a multi-station locking unit with one mold closed and one mold open shown in the horizontal type of stage construction.
Figure 3:
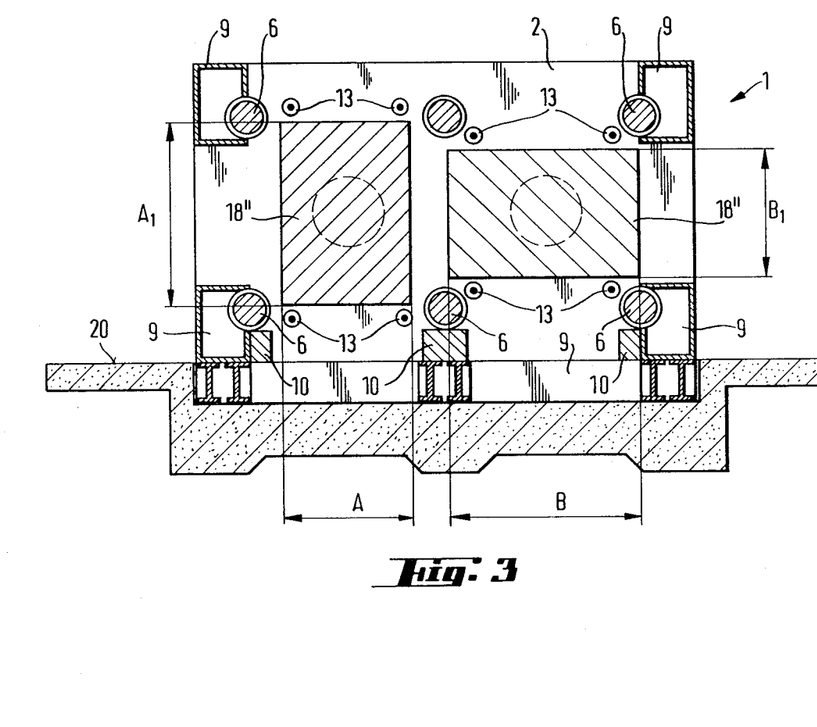
FIG. 3 is a sectional view showing a vertical cut through two mold halves arranged fixed on the stationary mold-clamping plate with the horizontal type of design, showing a variation of the mold arrangement.
Figure 4:
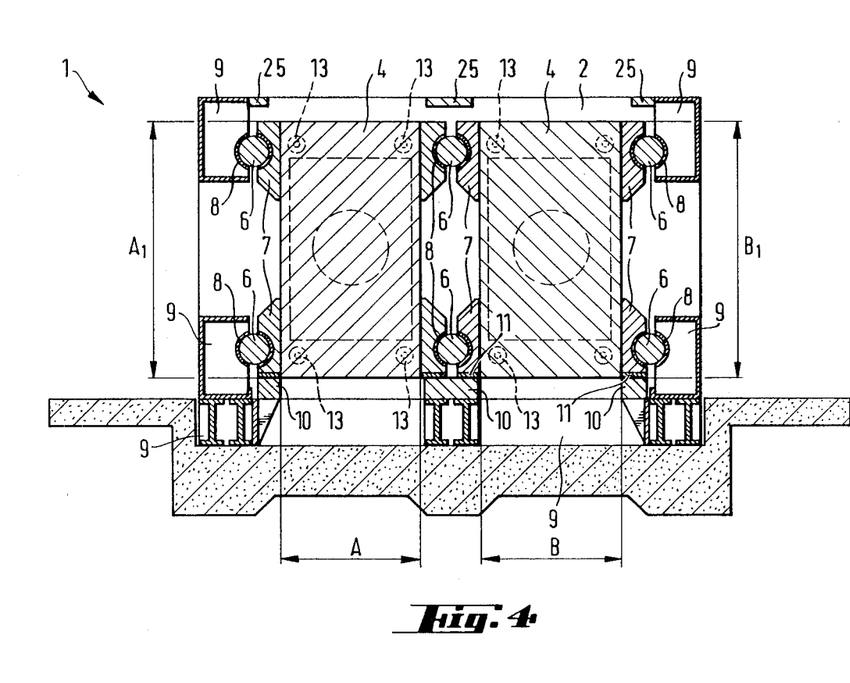
FIG. 4 shows a vertical sectional view through the two center movable mold-clamping plates in the direction of the stationary mold-clamping plate.
Figure 5:
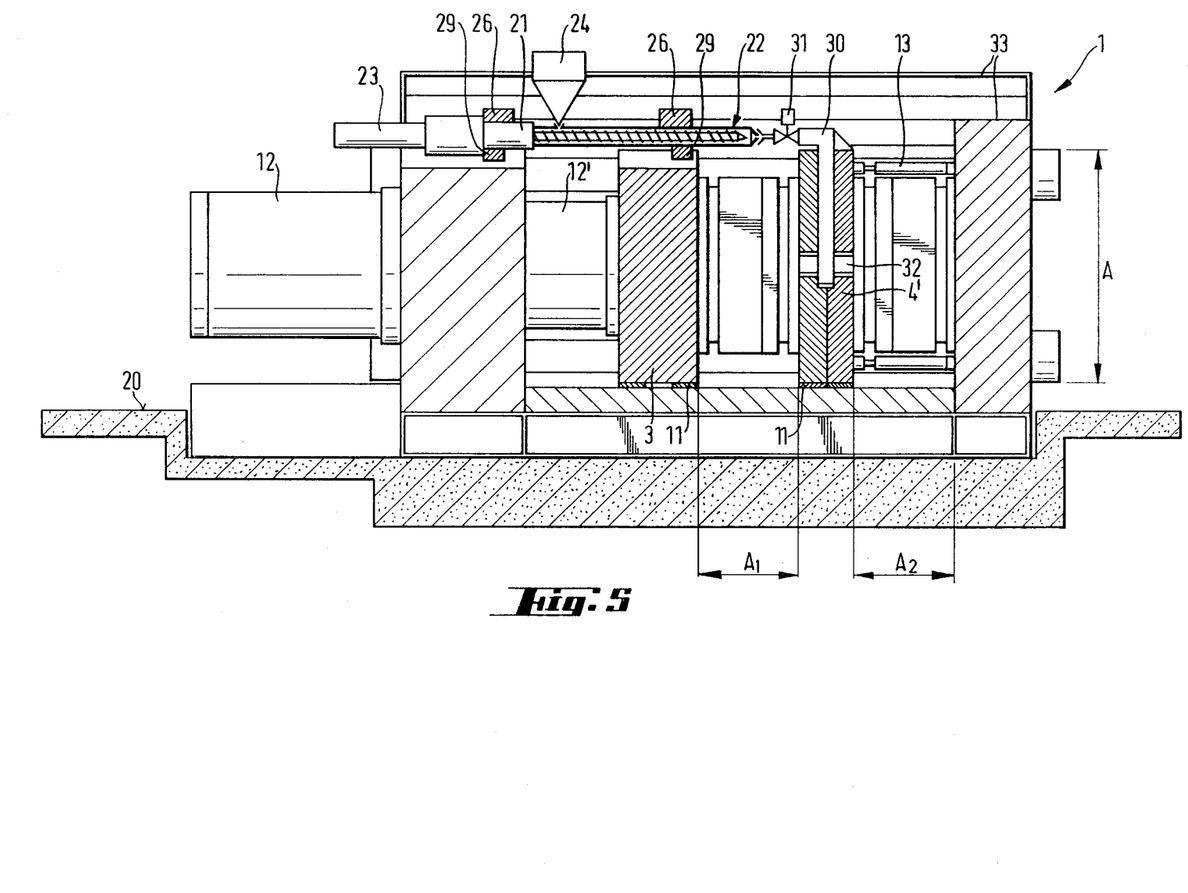
FIG. 5 shows the arrangement of FIG. 1 combined with an injection unit for the high-pressure injection molding technique.
Figure 6:
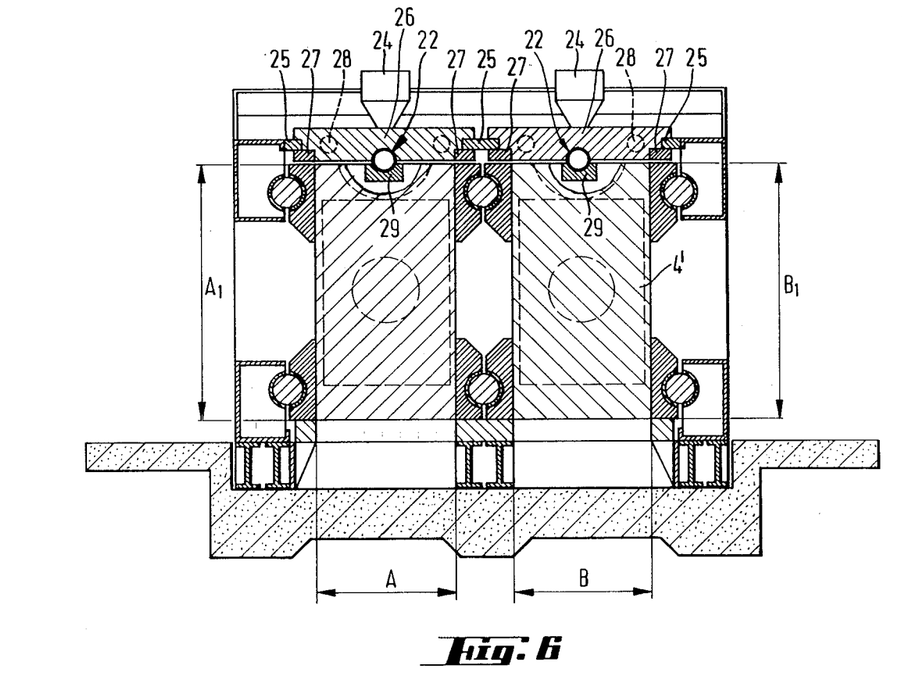
FIG. 6 is a vertical sectional view through the two center mold-clamping plates in the direction of the mold stages $A_2$ and $B_2$, in combination with two injection units for the high-pressure injection molding technique.

Walk-on work and inspection platforms 33 are mounted on the outside of the frame-like stand structure 9. Said platforms are provided with a railing for safety reasons. In FIGS. 5 and 6, the material feed hoppers are identified by reference numeral 24.

The two molds 18 and 19 of a locking unit A; B, which molds are comprised of identical parts and arranged between the three mold-clamping plates 2; 3; 4; 4', are simultaneously injected by an injection unit A;B using the high pressure or low pressure molding technique, whereby the pairs of molds 18; 19 of each 2-stage locking unit A; B are alternatingly injected based on the cascade principle.

Said manufacturing technique doubles the output of molded parts without changing the locking force requirement. The precondition for this is the use of two molds 18; 19 comprised of identical parts, whereby the surfaces of the parts of the mold, for physical reasons, are arranged with coincidence in the direction of the locking system. In this way, a second production device—which is required otherwise—is saved.

Another advantage of the invention is that several of 2-stage locking units can be combined to one multi-station locking unit 1. Said additional arrangement permits the alternating operation of a number of 2-stage locking units with a hydraulic driving system having only an installed driving output for one mold stage, by means of which hydraulic drive four mold stages $A_1$; $A_2$ and $B_1$; $B_2$ are operated in an alternating way.

The device according to the invention requires a minimum amount of setup space. As compared to known devices, about 75% space is saved with the horizontal design, i.e., the space requiremant comes to only 25% of the space required heretofore. With the vertical type of design, the ratio of required space as compared to known devices is even more favorable.

I claim:

1. In an injection molding apparatus for the manufacture of plastic parts from thermoplastic, duroplastic and/or elastomer material by injection molding or reaction injection molding, said apparatus having a multi-station locking unit of horizontal or vertical design adapted to receive a plurality of molds, an injection unit associated therewith for the simultaneous injection of the molds, two outer mold-clamping plates one of which is movably arranged on guide elements for moving in the locking direction, and a centrally disposed mold-receiving part movably arranged on guide elements between the two mold-clamping plates, said mold-receiving part being provided with a heatable melt-guiding system with sprue nozzles and having fastened to each of its two sides one half of a mold, the improvement comprising:

said centrally disposed mold-receiving part being a moveable center mold-clamping plate divided crosswise relative to the locking direction into two individual plates, said two plates of said moveable center mold-clamping plate being maintained together by a high-speed clamping device; said melt-guiding system having a heated central hot duct block being arranged between the two plates of said moveable center mold-clamping plate; and separate driving cylinders being fastened on said moveable center mold-clamping plate.

2. The injection molding apparatus of claim 1, which further comprises dismountable bearing supports associated with the movable center mold-clamping plate.

3. The injection molding apparatus of claim 2, which further comprises semi-cup bearings for supporting and guiding said movable center mold-clamping plate.

4. The injection molding apparatus of claim 3, wherein said semi-cup bearings are arranged exchangeably.

5. The injection molding apparatus of claim 1, wherein said sprue nozzles of the melt-guiding system are separately heatable.

6. The injection molding apparatus of claim 1, wherein bores are provided in said centrally disposed movable mold-clamping plate which serve as a hydraulic short-stroke bearing system of the movable center mold-clamping plate so as to press said sprue nozzles against the shaped bushings of the molds.

* * * * *